United States Patent
Chu et al.

(10) Patent No.: US 10,108,707 B1
(45) Date of Patent: Oct. 23, 2018

(54) DATA INGESTION PIPELINE

(71) Applicant: Amazon Technologies, Inc., Seattle, WA (US)

(72) Inventors: Yahui Chu, Cheswick, PA (US); Stephen Allen Whitney, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/712,571

(22) Filed: Sep. 22, 2017

(51) Int. Cl.
*G06F 17/00* (2006.01)
*G01L 15/00* (2006.01)
*G06F 17/30* (2006.01)
*G10L 13/08* (2013.01)
*G10L 15/26* (2006.01)

(52) U.S. Cl.
CPC .. *G06F 17/30761* (2013.01); *G06F 17/30516* (2013.01); *G06F 17/30867* (2013.01); *G10L 13/08* (2013.01); *G10L 15/265* (2013.01)

(58) Field of Classification Search
CPC ......... G06F 17/30699; G06F 17/30867; G06F 17/30672; G10L 15/00; G10L 15/22; G10L 15/24; G10L 2015/223; G10L 2015/30; G10L 2015/32; H04M 3/00; H04M 3/005; H04M 3/007

USPC .......... 700/84; 704/705, 275, 270; 707/705, 707/722, 732; 455/563; 709/244, 260

See application file for complete search history.

(56) References Cited

U.S. PATENT DOCUMENTS

| | | | |
|---|---|---|---|
| 8,099,289 B2 * | 1/2012 | Mozer | G10L 15/30 704/270 |
| 2008/0306936 A1 * | 12/2008 | Ho | G06F 17/30029 |
| 2016/0092581 A1 * | 3/2016 | Joshi | G06F 17/30672 707/732 |
| 2017/0221484 A1 * | 8/2017 | Poltorak | G10L 15/22 |

* cited by examiner

*Primary Examiner* — Melur Ramakrishnaiah
(74) *Attorney, Agent, or Firm* — Pierce Atwood LLP

(57) ABSTRACT

Techniques for expanding system capabilities to execute user commands relating to trending topics (e.g., real-time news questions, trending questions, sports questions, game questions, politic questions, etc.) are described. The system gathers data from a variety of sources (e.g., news feeds, social media feeds, RSS feeds, news websites, etc.). The system segments gathered data corresponding to, for example, topic and or entity. The system may only store data corresponding to a topic or entity in a dedicated trending storage if the system receives data corresponding to the topic or entity from a number of different sources satisfying a threshold number of sources. Data in the dedicated trending storage may be maintained using decay models or algorithms. For example, the more often the system receives data corresponding to a topic or entity from one or more sources, the longer the data is maintained in the storage, and vice versa.

20 Claims, 12 Drawing Sheets

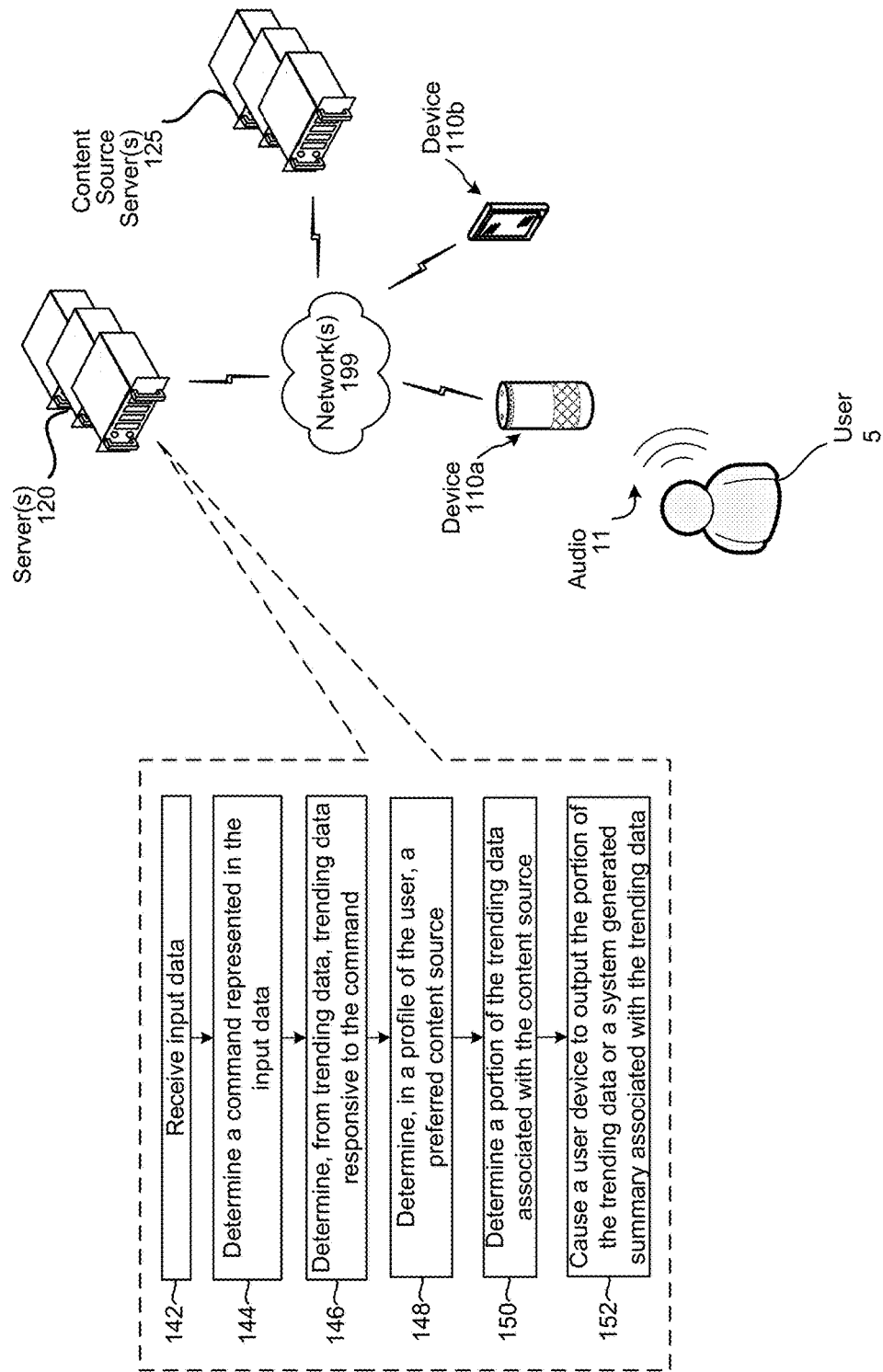

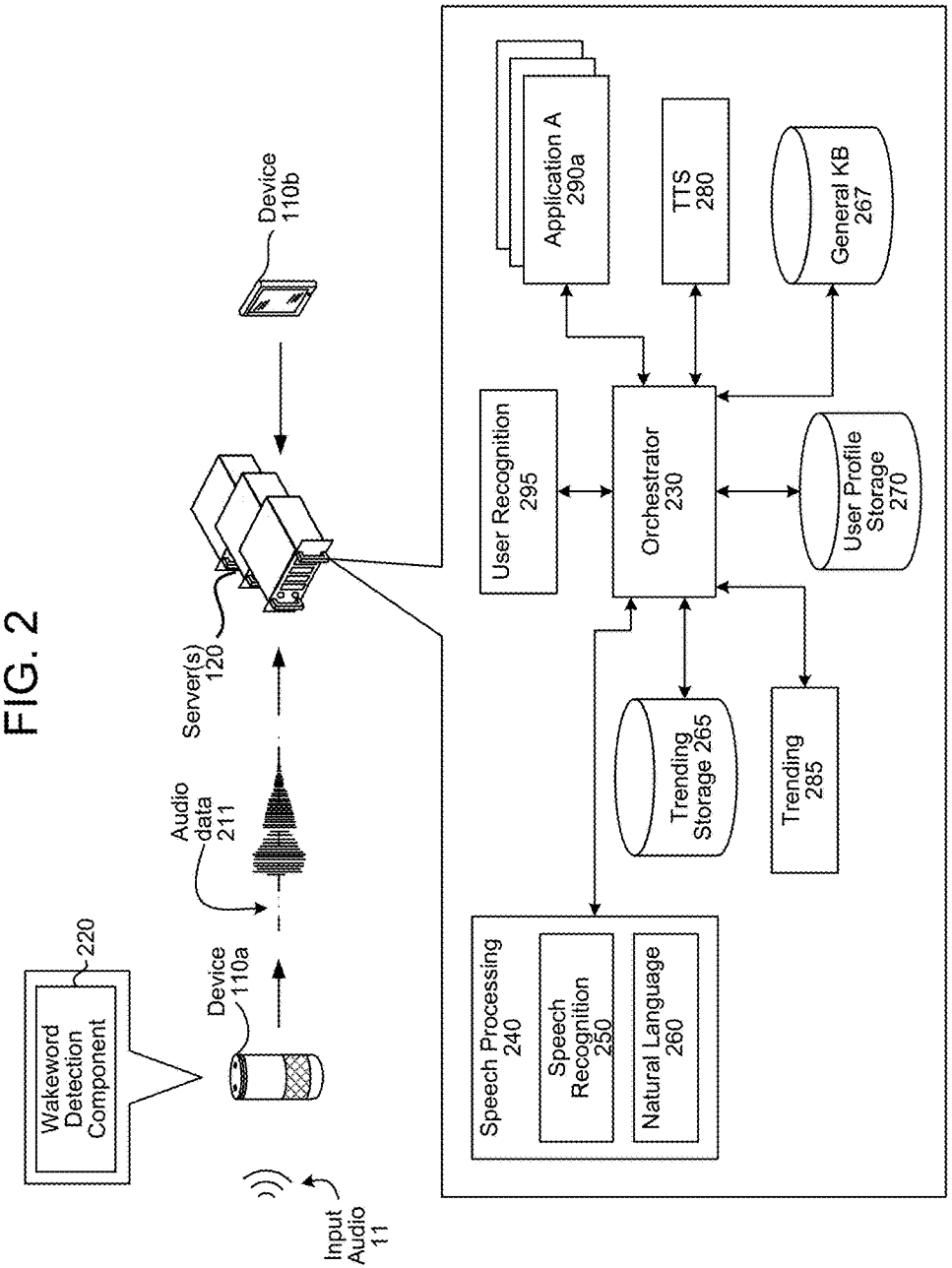

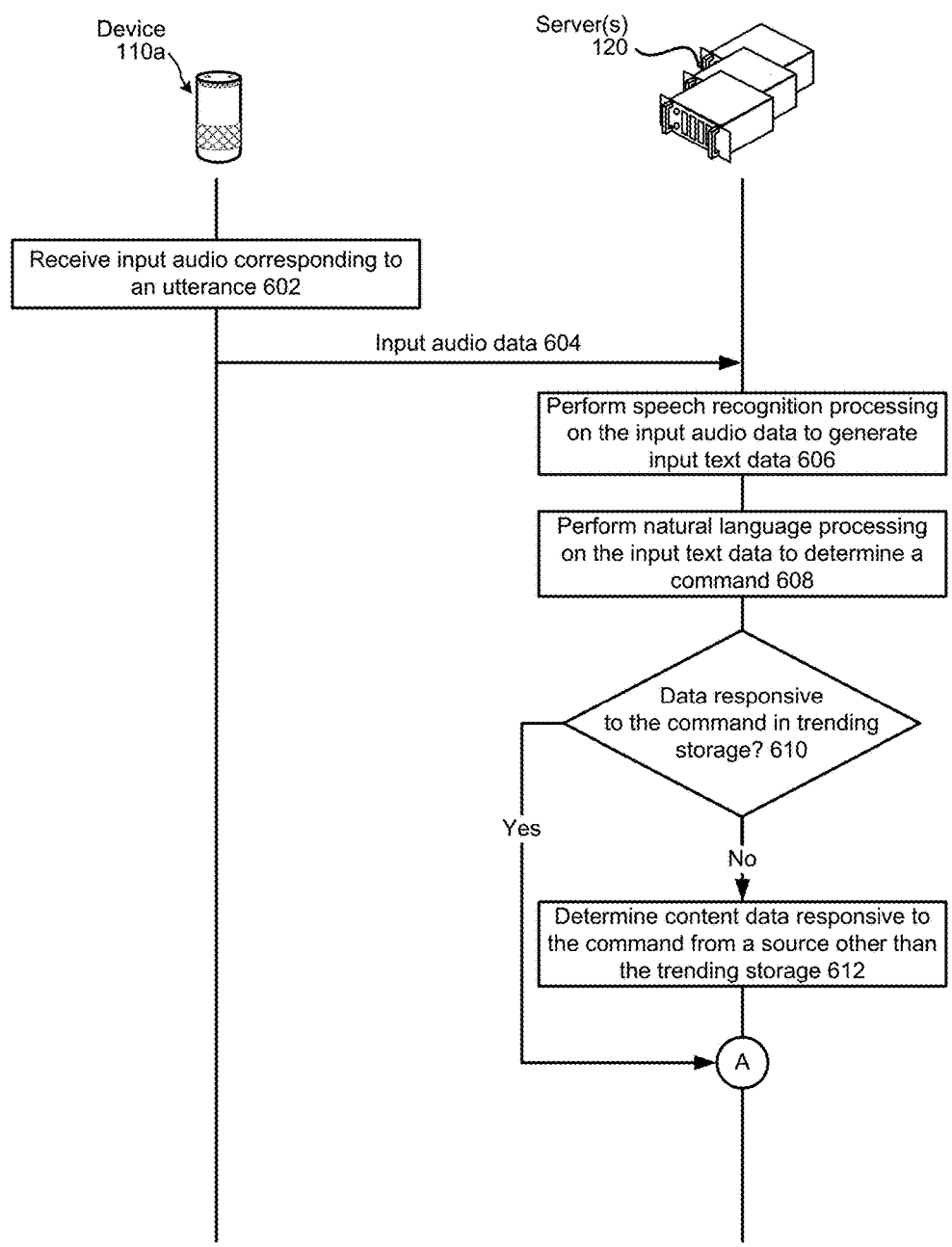

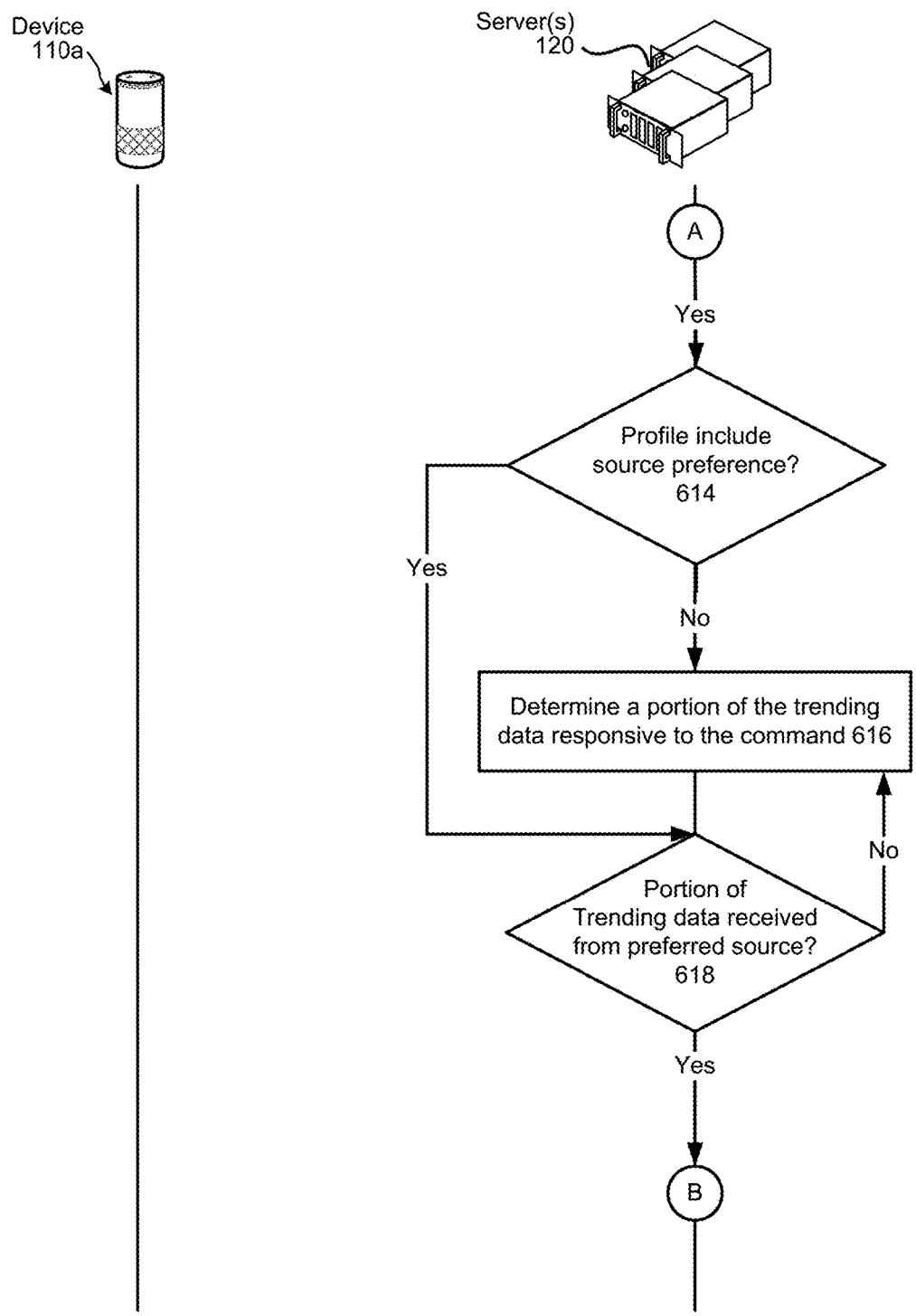

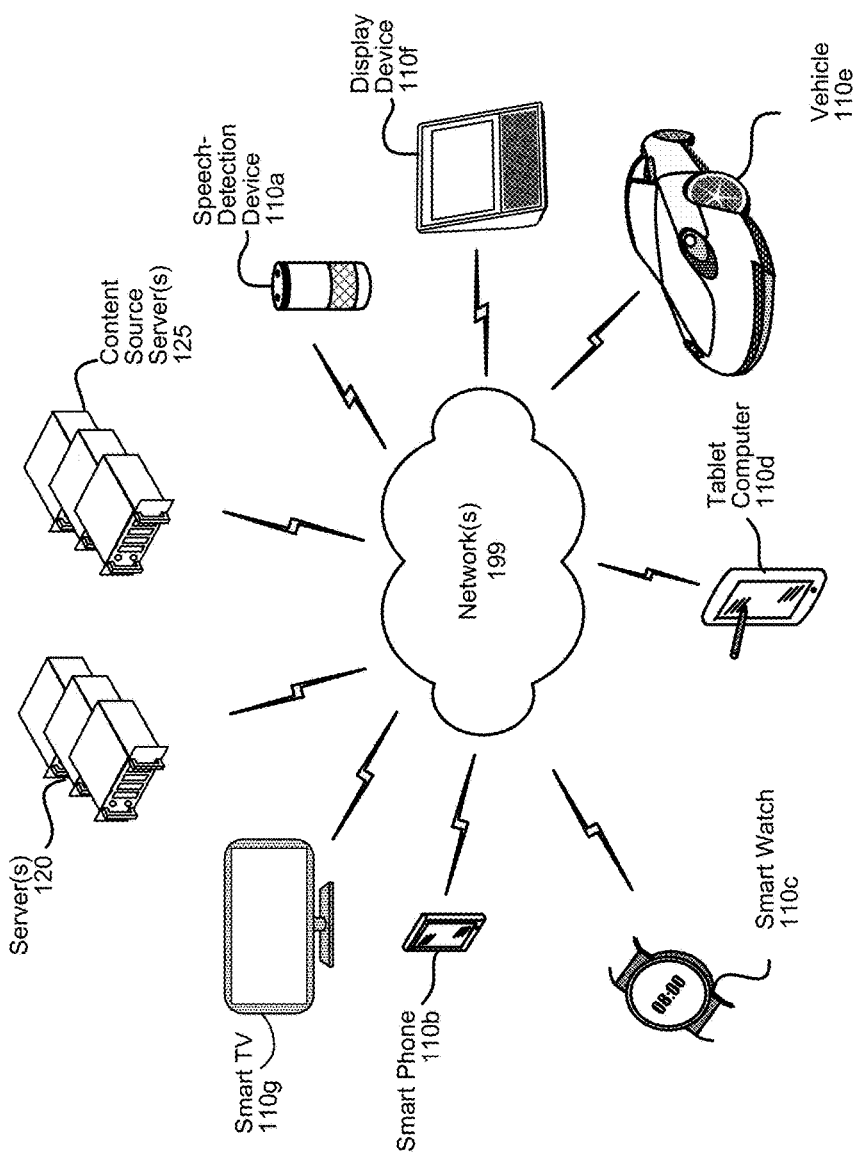

DATA INGESTION PIPELINE

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1B illustrates a system configured to execute user commands using trending data according to embodiments of the present disclosure.

FIG. 2 is a diagram of components of a system according to embodiments of the present disclosure.

FIGS. 6A through 6C are a signal flow diagram illustrating the execution of a user command using trending data stored in a trending storage according to embodiments of the present disclosure.

FIG. 9 illustrates an example of a computer network for use with the speech processing system.

DETAILED DESCRIPTION

Figure 1A:
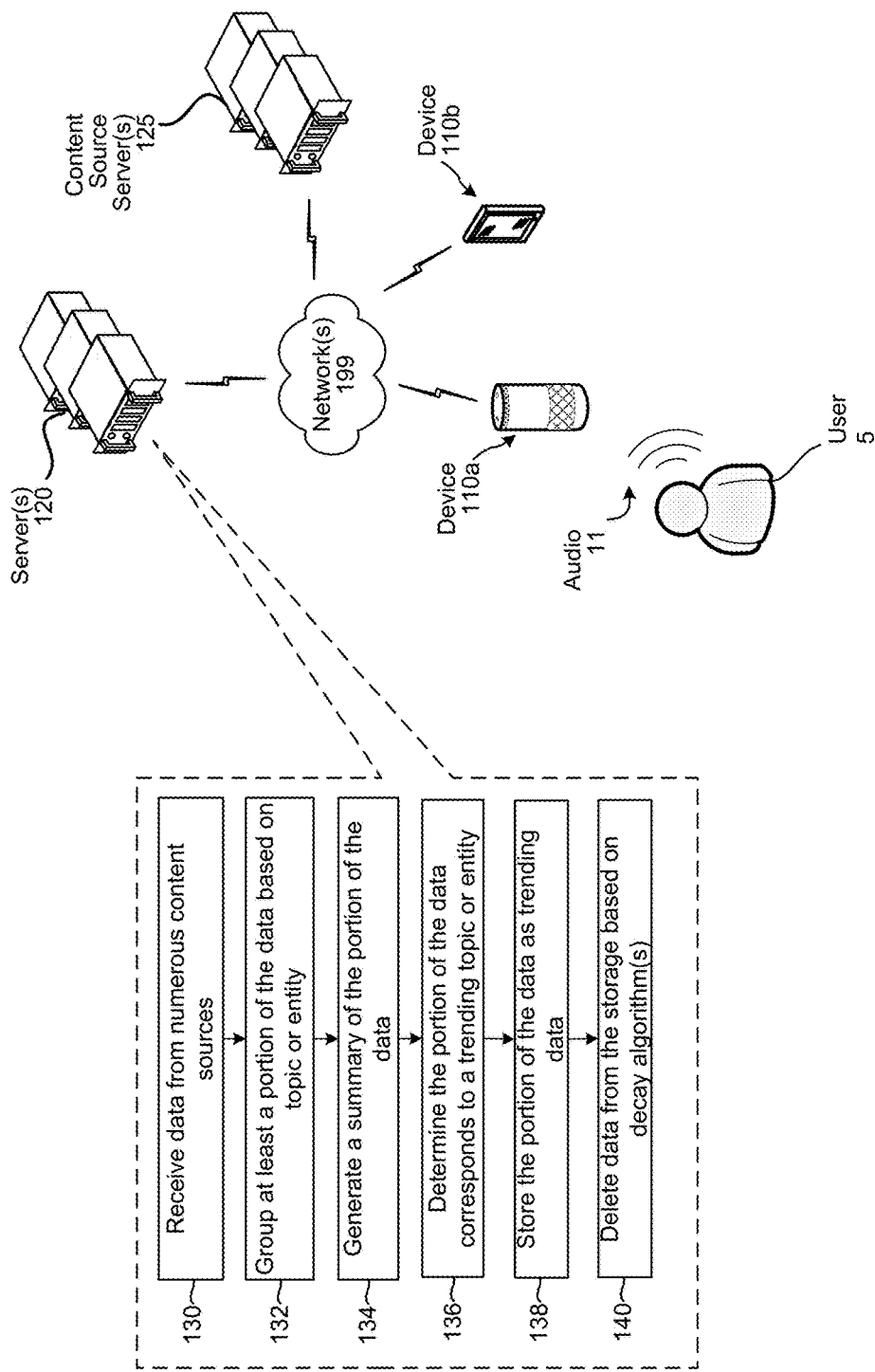
FIG. 1A illustrates a system configured to maintain a storage of trending data according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A computing system may be configured to answer user commands requesting the output of content. For example, a user may speak or type a command corresponding to "tell me the weather." The system may process the command and obtain responsive content from a content source, such as a weather service according to the above example. The system may be configured to communicate with various external content sources that enable the system to process more user commands than the system would be able to using purely internally generated content. The content sources may correspond to particular devices (such as servers, etc.), data feeds, or other information sources.

The present disclosure provides techniques for expanding system capabilities to execute user commands relating to trending topics (e.g., real-time news questions, trending questions, sports questions, game questions, politic questions, etc.). A topic may be considered "trending" if content corresponding to the topic is widely published or discussed on the Internet or in other content distribution modalities (e.g., television news, radio news, etc.) during a recent time period. Thus trending data may be data that has more popularity, prevalence, relevance or other importance within a particular recent or current time period as compared to other information or as compared to a different time period.

The system gathers content from a variety of sources (e.g., news feeds, social media feeds, RSS feeds, news websites, etc.). The system segments gathered content corresponding to topic. The system may further determine an attestation of the topic (e.g., determine how many different sources mention the topic). If the attestation of the topic is above a threshold, which means the topic may be trending across a sufficient number of sources, data corresponding to the topic is saved as trending data.

Trending data in the storage may be maintained using decay models or algorithms. For example, the more often a topic is mentioned by various sources, the longer data corresponding to the topic is maintained in the storage, and vice versa.

The system determines whether content responsive to a command is stored in the storage when the system receives the command. Thus, commands related to trending topics may be more easily handled by the system. Content responsive to the command and stored in the may originate from various sources. When this occurs, the system determines whether a profile, associated with the user that input the command, indicates a preferred source associated with a type corresponding to the command. For example, the profile may indicate content responsive to commands corresponding to requests for information about politicians should originate from a certain news source. For further example, the profile may indicate content responsive to commands corresponding to requests for information about celebrities should originate from a certain social media news feed. The system then determines, from among the content in the storage responsive to the command, a portion of the content received from the user preferred content source. When the user profile does not indicate a user preferred content source associated with the command type, the system may determine a portion of the content in the storage to output to the user. For example, the system may determine the portion of the content based on content source rating (e.g., indicating a veracity of the content source). The system then outputs the portion of the content to the user.

FIGS. 1A and 1B illustrate a system configured to maintain a storage dedicated to trending data as well as execute user commands using the stored trending data. Although the figures and discussion illustrate certain operational steps of the system in a particular order, the steps described may be performed in a different order (as well as certain steps removed or added) without departing from the intent of the disclosure. As illustrated in FIG. 1, devices (110a/110b) local to a user 5, one or more servers 120, and one or more content source servers 125 may be connected across one or more networks 199. The server(s) 120 (which may be one or more different physical devices) may be capable of performing traditional speech processing (e.g., speech recognition processing such as ASR, natural language processing such as NLU, command processing, etc.) as well as other operations. A single server 120 may perform all speech processing or multiple servers 120 may combine to perform all speech processing. Further, the server(s) 120 may execute certain commands, such as answering spoken utterances of users 5 and operating other devices (e.g., light switches, appliances, etc.).

As illustrated in FIG. 1A, the server(s) 120 is configured to maintain a data storage of trending data in real-time or substantially real-time. The server(s) 120 receives (130) data from numerous content sources. The server(s) 120 may group (132) at least a portion of the data based on topic or entity. The server(s) 120 may also generate (134) a summary of the portion of the data. The server(s) 120 may also determine (136) the portion of the data corresponds to a trending topic or entity. Based thereon, the server(s) 120 stores (138) the portion of the data as trending data. The server(s) 120 may also store the portion of the data in the systems general knowledge base. This enables the system to answer input commands using the portion of the data after the portion of the data is no longer trending. The topic or entity represented in the portion of the data may be considered trending if the server(s) 120 received the portion of the data from a minimum number of different content sources. The server(s) 120 may also delete (140) data from the storage based on one or more decay models or other types of algorithms. For example, the more frequently the server(s) 120 receives data representing a topic or entity, the longer the server(s) 120 permits data in the storage corresponding to the topic or entity to remain in the storage, and vice versa.

As illustrated in FIG. 1B, the system may be configured to execute a user command using trending data stored in the dedicated storage. A user 5 may speak a command (represented as audio 11). A device 110a including a microphone (or array of microphones) captures the audio 11, generates input data corresponding to the audio 11, and sends the input data to the server(s) 120 over the network(s) 199. Alternatively, the user 5 may input text (e.g., via a virtual keyboard) to a companion application executed on a device 110b and associated with the server(s) 120. The device 110b, by executing the companion application, generates input data corresponding to the input text and sends the input data to the server(s) 120 over the network(s) 199.

The server(s) 120 receives (142) the input data from the device (110a/110b) and processes the input data to determine (144) a command represented therein. If the input data is audio data, processing of the input data may include performing speech recognition processing (e.g., ASR) on the input data to generate input text data and performing natural language processing (e.g., NLU) on the input text data to determine the command. If the input data is text data, processing of the input data may including performing natural language processing (e.g., NLU) on the input data to determine the command.

The server(s) 120 may determine (146) trending data responsive to the command. The trending data may be identified from trending storage dedicated to storing data corresponding to trending topics. The trending data may also be identified as data with an associated trending indicator (such as a set bit flag indicating the data as trending). Other techniques for determining/identifying trending data may also be used. The server(s) 120 may also determine (148) a preferred content source indicated in a profile associated with the user 5. For example, the profile may indicate content responsive to commands corresponding to requests for information about politicians should originate from a certain news source. For further example, the profile may indicate content responsive to commands corresponding to requests for information about celebrities should originate from a certain social media news feed.

The server(s) 120 may determine (150) a portion of the trending data, responsive to the command and stored in the trending storage, associated with the content source indicating in the profile. The server(s) 120 then causes (152) a user device to output the portion of the trending data or a system generated summary associated with the trending data. The determined portion of the trending data may either be audio data or text data. If the portion of the trending data is text data that should be output as synthesized speech, the server(s) 120 performs TTS on the portion of the trending data to generate output audio data and sends the output audio data to a user device (e.g., the device 110a) for output to the user 5. If the portion of the trending data is audio data that should be output as text, the server(s) 120 performs speech recognition processing on the portion of the trending data to generate output text data and sends the output text data to a user device (e.g., the device 110b or a companion application executed thereon) for output to the user 5. If the portion of the trending data is audio data that should be output as audio or text data that should be output as text, the server(s) 120 simple sends the portion of the trending data to a user device (e.g., the device 110a or the device 110b) for output to the user 5. The server(s) 120 may also send an instruction to the device (110a/110b) instructing the device (110a/110b) to output the content sent thereto.

The system may track trending data in a number of ways. To store data as trending data, the system may store the data along with an indicator (such as a bit flag or otherwise) associated with the data that indicates the data to be trending. Thus the system may identify trending data if the indicator/bit flag is set, thus marking the associated data as trending data. The system may also have a separate storage that is used to store trending data, where data is moved into the separate storage when noted as trending and moved out of the separate storage when no longer trending. Thus trending data may be grouped together for storage and/or indexing purposes. A number of other techniques are also possible for marking and/or tracking data as trending data. Although certain descriptions herein may describe one or more such techniques of indicating or storing data as trending data, any such technique may be used even if not explicitly mentioned for a particular example herein.

The system may operate using various components as described in FIG. 2. The various components illustrated FIG. 2 may be located on a same or different physical devices. Communication between various components illustrated in FIG. 2 may occur directly or across a network(s) 199.

The device 110a captures input audio 11, corresponding to a spoken utterance, using an audio capture component, such as a microphone or array of microphones. The device 110a, using a wakeword detection component 220, processes audio data corresponding to the input audio 11 to determine if a keyword (e.g., a wakeword) is detected in the audio data. Following detection of a wakeword, the device 110a sends audio data 211, corresponding to the utterance, to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system.

The orchestrator component 230 sends the audio data 211 to a speech processing component 240. A speech recognition component 250 of the speech processing component 240 transcribes the audio data 211 into one more textual interpretations representing speech contained in the audio data 211. The speech recognition component 250 interprets the spoken utterance based on a similarity between the spoken utterance and pre-established language models. For example, the speech recognition component 250 may compare the audio data 211 with models for sounds (e.g., subword units or phonemes) and sequences of sounds to identify words that match the sequence of sounds spoken in the utterance represented in the audio data 211. The speech recognition component 250 sends text data generated thereby to a natural language component 260 of the speech processing component 260. The text data sent from the speech recognition component 250 to the natural language component 260 may include a top scoring textual interpretation of the audio data 211 or may include an N-best list including a group of textual interpretations of the audio data 211 and potentially their respective scores.

Instead of the device 110a capturing the input audio 11, the device 110b may receive (e.g., via a keyboard presented on a touch sensitive display thereof) input text. The device 110b may receive the input text while the device 110b is executing a companion application associated with the server(s) 120. The device 110b generates text data corresponding to the input text and sends the text data to the server(s) 120. Upon receipt by the server(s) 120, the text data may be sent to the orchestrator component 230, which sends the text data to the natural language component 260.

The natural language component 260 attempts to make a semantic interpretation of the phrases or statements represented in the text data input therein. That is, the natural language component 260 determines one or more meanings associated with the phrases or statements represented in the text data based on individual words represented in the text data. The natural language component 260 interprets a text string to derive an intent of the user command represented in the text data (e.g., an action that the user desires be performed) as well as pertinent pieces of information in the text data that allow a device (e.g., the device 110a, the device 110b, the server(s) 120, the content source server(s) 125, etc.) to complete the intent. For example, if the text data corresponds to "call mom," the natural language component 260 may determine the user intended to activate a telephone in his/her device and to initiate a call with a contact matching the entity "mom."

The server(s) 120 may include a user recognition component 295. The user recognition component 295 may take as input the audio data 211, the text data received by the server(s) 120 from the device 110b, and/or the text data output by the speech recognition component 250. The user recognition component 295 determines scores indicating whether the command originated from particular users. For example, a first score may indicate a likelihood that the command originated from a first user, a second score may indicate a likelihood that the command originated from a second user, etc. The user recognition component 295 also determines an overall confidence regarding the accuracy of user recognition operations. If the system receives the user command as audio data 211, the user recognition component 295 may perform user recognition by comparing speech characteristics in the audio data 211 to stored speech characteristics of users. The user recognition component 295 may also perform user recognition by comparing biometric data (e.g., fingerprint data, iris data, etc.) received by the user recognition component 295 to stored biometric data of users. The user recognition component 295 may further perform user recognition by comparing image data including a representation of at least a feature of a user with stored image data including representations of features of users. The user recognition component 295 may perform additional user recognition processes, including those known in the art. Output of the user recognition component 295 may be used to inform natural language processing as well as processing performed by applications 290.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer identifier (ID). A customer profile may be an umbrella profile specific to a group of users. That is, a customer profile encompasses two or more individual user profiles, each associated with a unique respective user ID. For example, a customer profile may be a household profile that encompasses user profiles associated with multiple users of a single household. A customer profile may include preferences shared by all of the user profiles encompassed thereby. Each user profile encompassed under a single customer profile may include preferences specific to the user associated therewith. That is, each user profile may include preferences unique with respect to one or more other user profiles encompassed by the same customer profile. A user profile may be a stand-alone profile or may be encompassed under a customer profile. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199.

The orchestrator component 230 may send output from the natural language component 260 (e.g., text data including tags attributing meaning to the words and phrases represented in the text data), and optionally output from the user recognition component 295 and/or data from the user profile storage 270, to one or more applications 290. FIG. 2 illustrates various applications 290 executed by the server(s). However, it should be appreciated that the orchestrator component 230 may additionally or alternatively send output from the natural language component 260 to one or more remote devices (e.g., servers) executing applications that may thereby cause the remote device to provide the server(s) 120 with content responsive to the command.

An "application," as used herein, may be considered synonymous with a skill. A "skill" may be software running on the server(s) 120 that is akin to an application. That is, a skill may enable the server(s) 120 or other remote device to execute specific functionality in order to provide data or produce some other output requested by a user. The system may be configured with more than one skill. A skill may either be executed by the server(s) 120 or merely associated with the server(s) 120 (i.e., one executed by a different remote device). For example, a weather service skill may enable the server(s) 120 to execute a command with respect to a weather service server(s), a car service skill may enable the server(s) 120 to execute a command with respect to a taxi or ride sharing service server(s), an order pizza skill may enable the server(s) 120 to execute a command with respect to a restaurant server(s), etc.

The orchestrator component 230 may choose which application 290 to send data to based on the output of the natural language component 260. In an example, the orchestrator component 230 may send data to a music playing application when the natural language component 260 outputs text data associated with a command to play music. In another example, the orchestrator component 230 may send data to a weather application when the natural language component 260 outputs text data associated with a command to output weather information. In yet another example, the orchestrator component 230 may send data to a search engine application when the natural language component 260 outputs text data associated with a command to obtain search results.

An application 290 may output text data, which the orchestrator component 230 may send to a TTS component 280. The TTS component 280 may synthesize speech corresponding to the text data input therein. The server(s) 120 may send audio data synthesized by the TTS component 280 to the device 110a (or another device including a speaker) for output to the user.

The TTS component 280 may perform speech synthesis using one or more different methods. In one method of synthesis called unit selection, the TTS component 280 matches text data against a database of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The server(s) 120 may additionally include a trending storage 265 storing trending data. Trending data may also be stored in a same storage as non-trending data, only the trending data may be associated with an indicator marking the associated data as trending. Data storage may include data segmented by topic. Each topic may be associated with data received from one or more content sources. For example, each piece of data (trending or not) may be associated with metadata or another indication indicating the topic to which the data pertains. Segmenting the data by topic enables the server(s) 120 to effectively query data storage (such as trending storage 265, a general knowledge base (KB) 267, or other storage) to determine whether the storage includes data responsive to a command. For example, the natural language component 260 may output text data tagged with an indication of a topic to which the command likely relates. The server(s) 120 may use the topic as an index to query storage to determine whether the storage includes data relating to the topic of the command.

The server(s) 120 may include a general knowledge base 267 storing data that the server(s) 120 uses to answer input commands. The general knowledge base 267 may include data that is presently stored in the trending storage 265, data that was but no longer is stored in the trending storage 265, and/or data that was never stored in the trending storage 265.

The server(s) 120 may further include a trending component 285 configured to manage, maintain and track trending data (whether stored in the trending storage 265 or otherwise). For example, the trending component 285 may aggregate trending data from a variety of sources, extract content from the aggregated trending data, summarize the extracted content, and categorize the summarized content as described herein with respect to FIG. 4.

Figure 3:
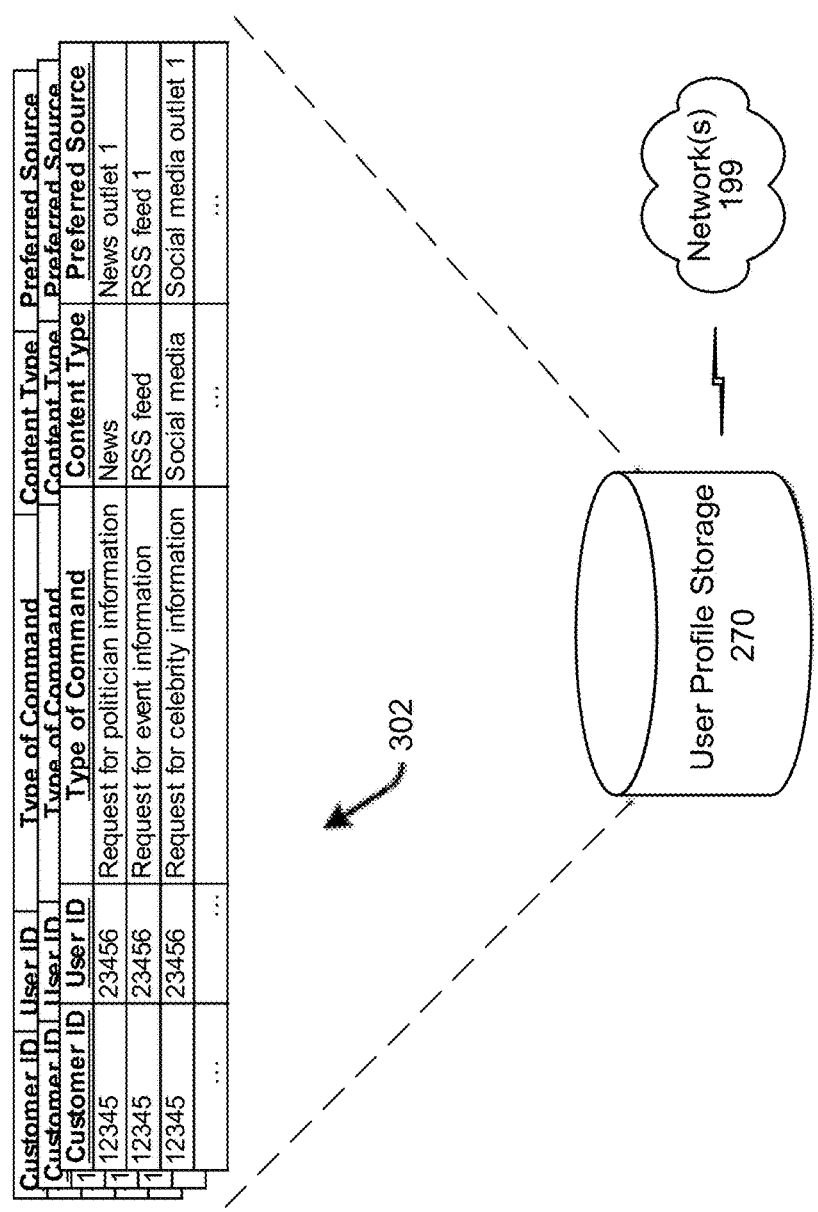
FIG. 3 illustrates data stored and associated with user profiles according to embodiments of the present disclosure.

FIG. 3 illustrates the user profile storage 270 that includes data regarding customer profiles as well as individual user profiles 302. For illustration, as shown in FIG. 3, each user profile 302 may include information indicating type types of commands inputtable by a user. Each type of command may be associated with a type of content the user prefers to be output with respect to the type of command. Moreover, the each type of content may be associated with a source from which the user prefers the system to receive the type of content from. Each user profile 302 may additionally include other data not explicitly illustrated.

Figure 4:
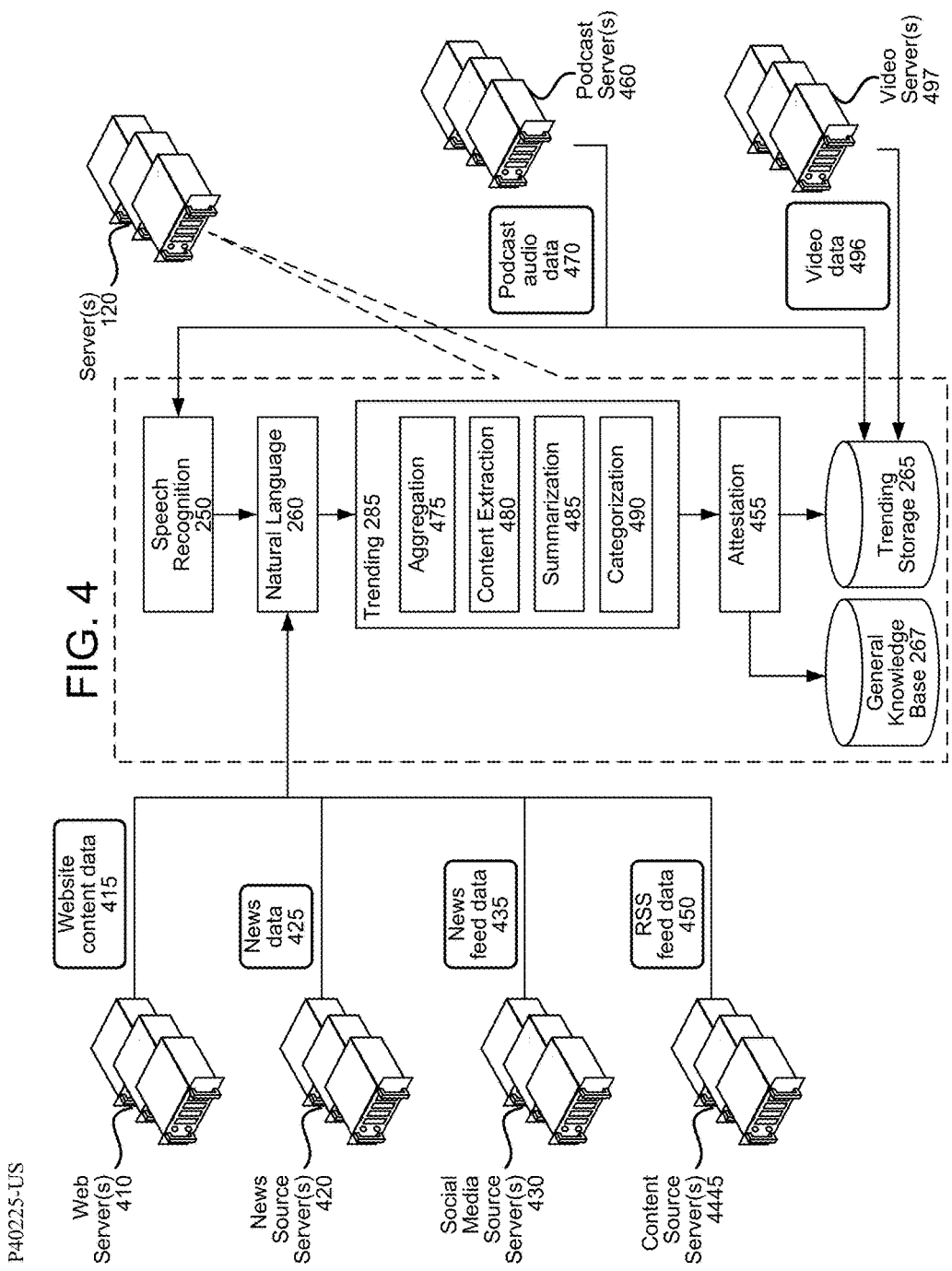
FIG. 4 is a system diagram illustrating the population of a trending storage according to embodiments of the present disclosure.

FIG. 4 illustrates the selection of data as trending data for population of the trending storage 265 or other storage. The server(s) 120 receives data from a variety of sources and in a variety of formats (e.g., audio data, video data, image data, text data, etc.). The server(s) 120 may receive website content data 415 from one or more web servers. The website content data 415 may represent content presented on one or more web pages of one or more websites. The server(s) 120 may receive news data 425 from one or more news source servers 420. The news data 425 may represent news stories presented using the Internet, television broadcasting, radio broadcasting, etc. The server(s) 120 may receive news feed data 435 from one or more social media source servers 430. The news feed data 435 may represent social media posts or other information presented on one or more social media feeds of one or more social media users. For example, the social media feed data 435 may be specific to contacts of the user represented in a contact list associated with a profile of the user. The server(s) 120 may receive rich site summary (RSS) feed data 450 from one or more RSS feed servers 445, which receives content from a syndicate of content sources. The RSS feed data 450 may represent syndicated regularly changing Internet content published by news-related websites, weblogs, and other online publishers. The server(s) 120 may receive podcast audio data 470 from one or more podcast servers 460. The podcast audio data 470 may represent one or more podcasts originating from one or more podcast publishers. The server(s) 120 may receive video/multimedia data 496 from one or more video/multimedia servers 497. The server(s) 120 may receive other content from other content sources as well.

If the server(s) 120 receives data as audio data, the speech recognition component 250 processes the audio data to generate text data. The natural language component 260 processes text data (either generated by the speech recognition component 250 or as received from a content source) to tag portions of the text data to attribute semantic meaning to the tagged portions.

The server(s) 120, for example the orchestrator component 230, causes the data as received by the server(s) 120, the text data output by the speech recognition component 250, and/or the tagged text data output by the natural language component 260 to be sent to the trending component 285.

The trending component 285 may include an aggregation component 475 that groups data received from various content sources based on, for example, topic, entity (e.g., politician name or celebrity name), etc. The aggregation component 475 may determine how many sources publish, within a certain time period, articles or other data corresponding to a particular topic and may determine whether that number falls above or below a particular threshold. If the number is above the threshold, the topic may be considered trending. If the number is below the threshold, the topic may be considered to not be trending (or to no longer be trending). For example, if a currently trending topic falls below the threshold the aggregation component 475 may determine a future time at which to no longer consider the data trending (for example by removing a trending indicator associated with the data, removing the data from trending storage, etc.). The aggregation component 475 may also use a number of other techniques to determine if data is trending.

For example, the aggregation component 475 may implement one or more unsupervised machine learning models. The aggregation component 475 enables stored trending data to be segmented based on topic, entity, etc. The server(s) may include a training component for training or creating various functions, models, classifiers, FSTs, or other such items, such as the aggregation component 475. The aggregation component 475 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The trending component 285 may also include a content extraction component 480 that extracts content from the data input to the trending component 285. For example, the content extraction component 480 may use metadata associated with the tagged text data output by the natural language component 260 to determine, for example, a user understandable data source identifier. For example, if news data 425 is received from a news source server 420, the data source identifier may correspond to a trade name associated with a business entity that manages the news source server 420. The content extractor component 480 may also determine entities from the tagged text data output by the natural language component 260. For example, the content extractor component 480 may determine a name of an individual (e.g., a celebrity's name, a politician's name, etc.) referred to in the tagged text data. The content extraction component 480 may also determine the kind of event to which input data relates. The content extractor component 480 may include multiple extractors, with each extractor being configured to extract content with respect to a different domain of the system. A domain may refer to a group of content associated with a common characteristic, such as music, movie, shopping, communication, etc. The content extractor component 480 may also or alternatively include one or more content extractors configured to extract content with respect to a respective command topic.

The trending component 285 may further include a summarization component 485 that summarizes trending data received from one or more content sources. For example, the summarization component 485 may generate a synopsis of trending data received from a single content source. For further example, the summarization component 485 may generate a synopsis of trending data received from multiple content sources. The system may cause a user device to output the synopsis in response to a command corresponding to a topic or entity corresponding to the synopsis. The summarization component 485 may be implemented as a supervised machine learning component. The summarization component 485 may include more than one machine learned model. The summarization component 485 may include a separate machine learned model for each type of content source (e.g., one model for news sources, one model for social media sources, one model for web sources, etc.).

The trending component 285 may additionally include a categorization component 490 that classifies content of the data input thereto. For example, the categorization component 490 may classify content based on time, location, entities, etc. The categorization component 490 may also classify content based on category (e.g., science, history, political science, etc.).

The server(s) 120 may further include an attestation component 455 that acts as a gatekeeper to selecting data as trending data. The attestation component 455 may be integrated within the trending component 285 or separate from the trending component 285 (as illustrated in FIG. 4). The attestation component 455 may determine whether data received by the server(s) 120 is "trending." If the attestation component 455 determines the received data is not trending, the attestation component 455 prevents the received data from being stored as trending data. Conversely, if the attestation component 455 determines the received data is trending, the attestation component 455 enables the data to be stored as trending data.

The attestation component 455 may implement one or more attestation standards to determine whether received data is trending. For example, the attestation component 455 may consider data (or a fact contained therein) to be trending based on the number of different content sources from which the server(s) 120 received the data (or the fact contained therein). The attestation component 455 may implement thresholding. For example, the attestation component 455 may determine data (or a fact contained therein) is trending if the server(s) 120 receives the data (or the fact contained therein) from a number of different content sources that satisfies (e.g., meets or exceeds) a threshold number of content sources.

The attestation component 455 may prevent data received from various sources and pertaining to a single topic or entity from being stored in the trending storage 265 until the number of sources from which the data pertaining to the single topic or entity satisfies the threshold number of content sources. Once the threshold is satisfied, the attestation component 455 may permit the data from all the sources pertaining to the single topic or entity to be stored as trending data.

As noted above, trending data may be stored in dedicated trending storage 265 and/or may be stored in some other storage such as general KB 267 or other storage along with an indicator associated with the data where the indicator indicates the data's status as trending.

The storage for trending data (which may include trending storage 265 or other storage) may include trending data grouped (i.e., segmented) by topic. In addition or alternatively, the storage may include trending data grouped by entity. Moreover, the storage may order the trending data based on rank. The rank of a certain portion of trending data may be based on the rate at which the topic entity to which the portion of trending data relates is mentioned in data received by the server(s) 120. The attestation component 455 (or another component of the server(s) 120) may determine how frequently the server(s) 120 receives data (or a fact contained therein) associated with a certain topic or entity. The attestation component 455 (or another component of the server(s) 120) may also or alternatively determine a number of content sources from which the server(s) 120 receives the data (or the fact contained therein) associated with the topic or entity. Based on the frequency and/or number of content sources, the attestation component 455 (or another component of the server(s) 120) may determine a rank score for the stored trending data associated with the topic or entity.

Trending data may be stored in a variety of formats (e.g., audio data, video data, text data, etc.). For example, the server(s) 120 may receive audio data (e.g., the podcast audio data 470) from a content source (e.g., the podcast server(s) 460). The speech recognition component 250 may process the audio data to generate text data. The natural language component 260 may process the text data to generate tagged text data. The server(s) 120 may then store the data as received from a content source as well as system processed data. According to the above example, the server(s) 120 may store the audio data, the text data output by the speech recognition component 250, and/or the tagged text data output by the natural language component 260.

The system may store trending data pertaining to a single topic or event that is received from a single source. For example, the server(s) 120 may receive multiple social media posts corresponding to a single topic or event from a single social media provider. The attestation component 455 may determine the multiple social media posts, while being received from a single source, are nonetheless trending based on the number of social media posts, and thereby cause the social media posts to be stored in the trending storage 265.

The attestation component 455 may also send trending data to the general knowledge base 267. At some point in time, the trending data stored in the general knowledge base 267 will no longer be trending. As described herein, the system deletes trending data from the trending storage 265 using various decay models. The system may not use the same decay models on the data stored in the general knowledge base 267. Thus, the system may permit the general knowledge base 267 to store data that was once but no longer is trending. This enables the system to use the previously trending data to answer input commands after the data is no longer trending.

Although the above describes storing data as trending data, the system may, alternatively or in addition, mark certain data as trending but rather than storing the data itself, the system may store an index of trending data where the index stores links, pointers, or other data used to access trending data that may be stored elsewhere. For example, the system may determine certain data is trending data, where the certain data is stored by a source separate from the system. The system may then store a link (such as a uniform resource locator (URL) or other link) to the certain data along with metadata corresponding to the data reachable by the link (e.g., metadata describing the content, topic, keywords, etc. associated with the certain data). Thus, if a future requests is received that calls for returning the certain data, the system may use the index to identify the certain data as trending data, identify the source of the certain data and cause the certain data to be output in response to the request (which may include obtaining and sending the certain data, sending a link to the certain data, or causing another device to send a link to the certain data).

Figure 5:
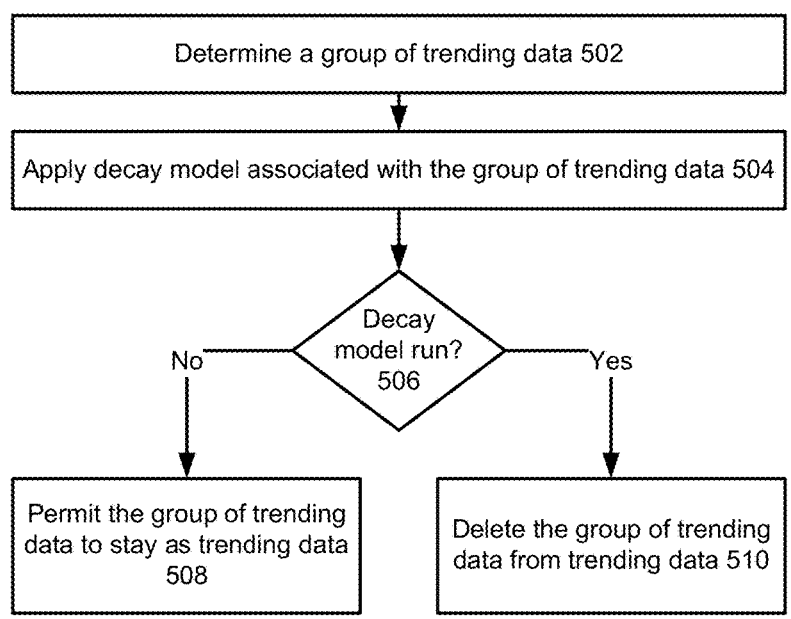
FIG. 5 is a process flow diagram illustrating a method for maintaining and deleting data in a trending storage according to embodiments of the present disclosure.

FIG. 5 illustrates techniques for maintaining and deleting data from the trending storage 265 based on one or more decay models or algorithms. A decay model enables the server(s) 120 to determine when trending data is no longer trending and therefrom delete the trending data from the trending storage 265.

The server(s) 120 determines (502) a group of trending data associated with a topic or entity. The server(s) 120 then applies (504) a decay model to the group of trending data. For example, a decay model may instruct the server(s) 120 to delete a group of trending data from the trending storage 265 when a growth of the group of trending data becomes stagnant or substantially stagnant. As indicated previously, groups of trending data in the trending storage 265 are associated with respective common topics or entities. As the server(s) 120 continues to receive data from content sources, the server(s) 120 may associate received data with a group (e.g., when received data is associated with a topic or entity already represented in the trending storage 265). Thus, it should be appreciated that a group of trending data in the trending storage 265 associated with a certain topic or entity may grow as the server(s) 120 receives additional data corresponding to the topic or entity.

A decay model may be a function of trending data group growth. That is, for a given group of trending data, the decay model representing how long the group may be permitted to remain in the trending storage 265 may become slower as the group grows. That is, the faster the group grows, the slower the decay model for the group. Conversely, the decay model may become faster as the group's growth slows (e.g., the growth moves towards stagnation.

A decay model may indicate, for a given group of trending data associated with a common topic or entity, a future time when the group should be deleted from the trending storage 265. As the group grows, the future time represented by the decay model may be pushed further in the future. If the group's growth becomes stagnant (e.g., the server(s) 120 ceases or substantially ceases receiving data corresponding to the topic or entity from content sources), the future time represented by the decay model may remain the same or be moved to a less future time (e.g., a more contemporaneous time).

The server(s) 120 determines (506) whether the decay model for the group of trending data has run. If the future time represented in the decay model has not happened yet, the server(s) 120 permits (508) the group of trending data to remain as trending data, which may include continuing to maintain an association between the group of data and a trending indicator, continuing to store the group of data in the trending storage 265, etc. If the future time represented in the decay model has occurred, the server(s) 120 deletes (510) the group of trending data from trending data, which may include removing an association between the group of data and a trending indicator, deleting the group of data from the trending storage 265, etc.

The trending storage 265 may include a plurality of groups of trending data, with each group being specific to a different topic or entity. Each group of trending data may be associated with a different decay model. The server(s) 120 may maintain a list of decay models with associated future times indicating when respective groups of training data should be deleted form the trending storage 265. Thus, the server(s) 120 may simply determine when a future delete time for a group of training data has occurred and therefrom delete the group of training data from the trending storage 265. The future times of the decay models represented in the list may change based on frequency or some other criteria as described with respect to FIG. 5, for example.

Figure 6C:
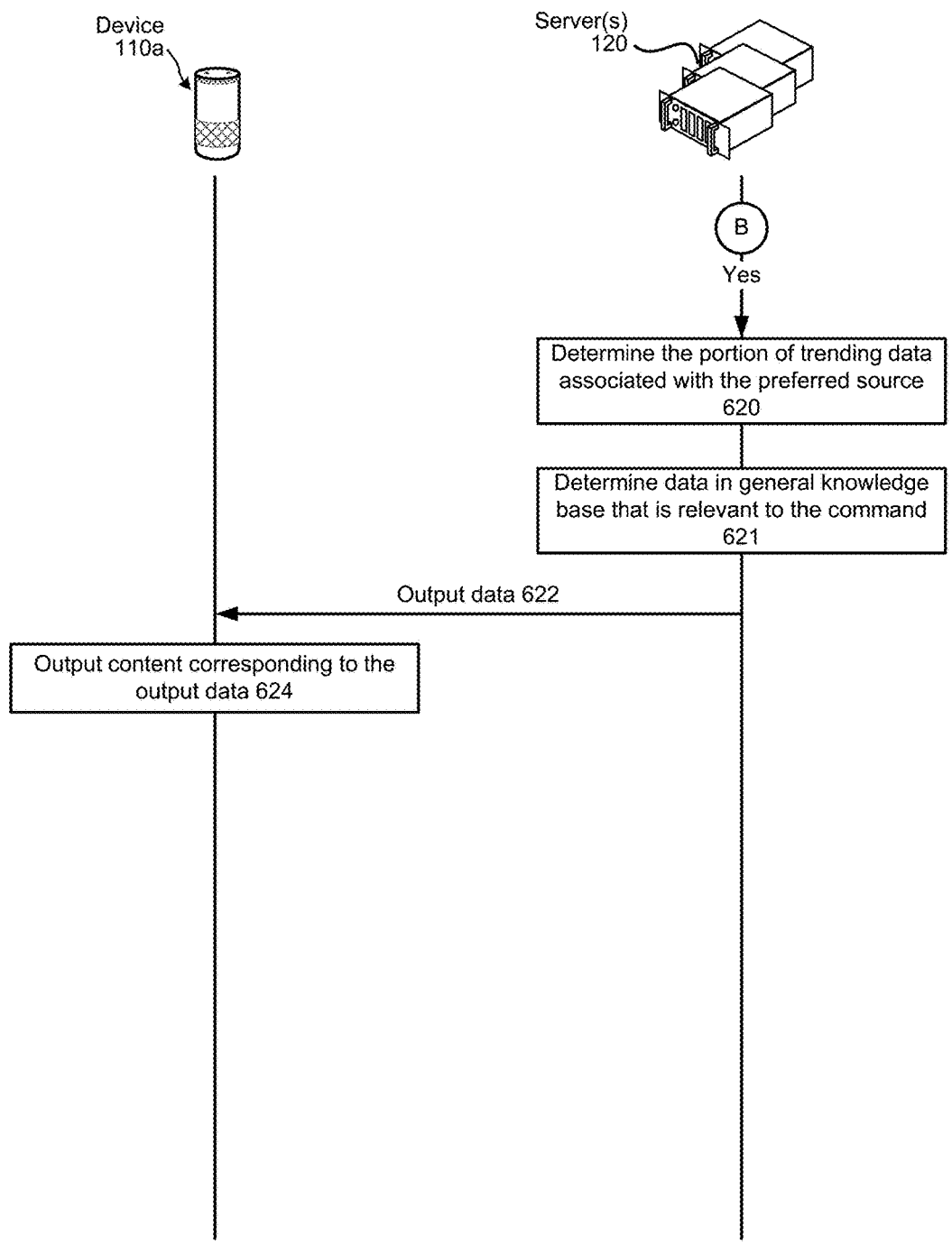

FIGS. 6A through 6C illustrate the system executing a user command using trending data stored in the trending storage 265. The device 110a receives (602) input audio corresponding to an utterance, generates audio data corresponding to the input audio, and sends (604) the input audio data to the server(s) 120. The server(s) 120 performs (606) speech recognition processing on the input audio data to generate input text data.

Alternative to the device 110a receiving the user utterance, the device 110b may receive input text via, for example, a virtual keyboard while the device 110b is executing a companion application associated with the server(s) 120. The device 110b generates input text data corresponding o the input text and sends the input text data, through the companion application, to the server(s) 120.

The server(s) 120 performs (608) natural language processing on the input text data (as generated by speech recognition processing or as received from the companion application) to determine a command represented in the input text data. The command may correspond to a request for content to be output.

The server(s) 120 determines (610) whether data responsive to the command is stored in the trending storage 265. For example, the server(s) 120 may determine whether entities tagged in text data output by the natural language processing correspond to entities represented in the trending storage 265. For further example, the server(s) 120 may determine whether a topic tagged in text data output by the natural language processing corresponds to a topic represented in the trending storage 265. If the server(s) 120 determines the trending storage 265 does not include data responsive to the command, the server(s) 120 determines (612) content data responsive to the command from a source other than the trending storage 265.

If the server(s) 120 determines the trending storage 265 includes data responsive to the command, the server(s) 120 determines (614) whether a profile associated with the user that input the command to the system includes a source preference. For example, the profile may indicate content responsive to commands corresponding to requests for information about politicians should originate from a certain news source. For further example, the profile may indicate content responsive to commands corresponding to requests for information about celebrities should originate from a certain social media news feed.

If the server(s) 120 determines the profile does not include a source preference, the server(s) 120 determines (616) a portion of the trending data (such as data in the trending storage 265), which is responsive to the command, for output to the user. Trending data responsive to a command may include various portions that the server(s) 120 received from various sources. Each source may be associated with a score indicating a veracity of data output by the source. When the profile does not include a source preference, the server(s) 120 may determine a portion of the trending data associated with the highest rank score.

If the server(s) 120 determines the profile includes a source preference, the server(s) 120 determines (618) whether the trending data responsive to the command includes a portion of trending data that the server(s) 120 received from the preferred source. If the server(s) 120 determines the trending data responsive to the command does not include a portion that the server(s) 120 received from the preferred source, the server(s) 120 determines (616) a portion of the trending data based on, for example, rank score. If the server(s) 120 determines the trending data responsive to the command includes a portion that that server(s) 120 received from the preferred source, the server (s) 120 determines (620) the portion for output to the user. The server(s) 120 may also determine (621) data in the system's general knowledge base that is relevant to the command.

The server(s) 120 sends (622) output data corresponding to the content data (illustrated as 612) or the determined portion of the trending data (illustrated as 616 or 620), and optionally data from the general knowledge base (illustrated as 621) to a device 110 associated with a profile of the user, and the device 110 outputs (624) content corresponding to the output data. The server(s) 120 may also send an instruction to the device 110 to output the output audio data.

The device 110 may be configured to output audio. If the content data or the portion of the trending data is text data, the server(s) 120 may perform TTS on the text data to generate synthesized speech outputtable by the device 110. If the content data or the portion of the trending data is audio data, the server(s) 120 may simply send the audio data to the device 110.

The device 110 may alternatively or also be configured to display text. If the content data or the portion of the trending data is audio data, the server(s) 120 may perform speech recognition on the audio data to generate text data displayable by the device 110. if the content data or the portion of the trending data is text data, the server(s) 120 may simply send the text data to the device 110.

After the device 110 outputs content to the user, the user may input a second command to the system indicating the user wants to receive further content corresponding to the same topic or entity. Such command may be spoken audio or input text corresponding to "tell me more," for example. If the content originally output to the user corresponded to a portion of a group of trending data, the system may determine a second portion of the same group of trending data to output to the user in response to the subsequent command. The second portion of trending data may be associated with the highest rank score of the group of trending data or the second highest rank score of the group of trending data depending on whether the originally output content corresponded to the portion of the group of trending data associated with the highest rank score.

Figure 7:
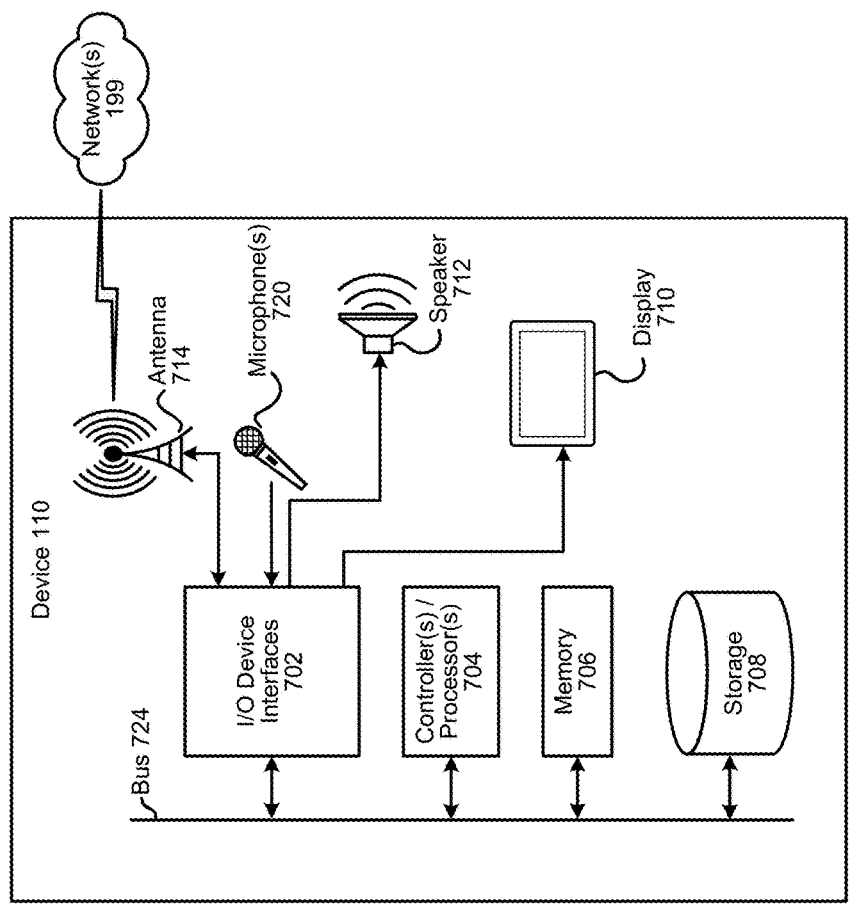
FIG. 7 is a block diagram conceptually illustrating example components of a device according to embodiments of the present disclosure.
Figure 8:
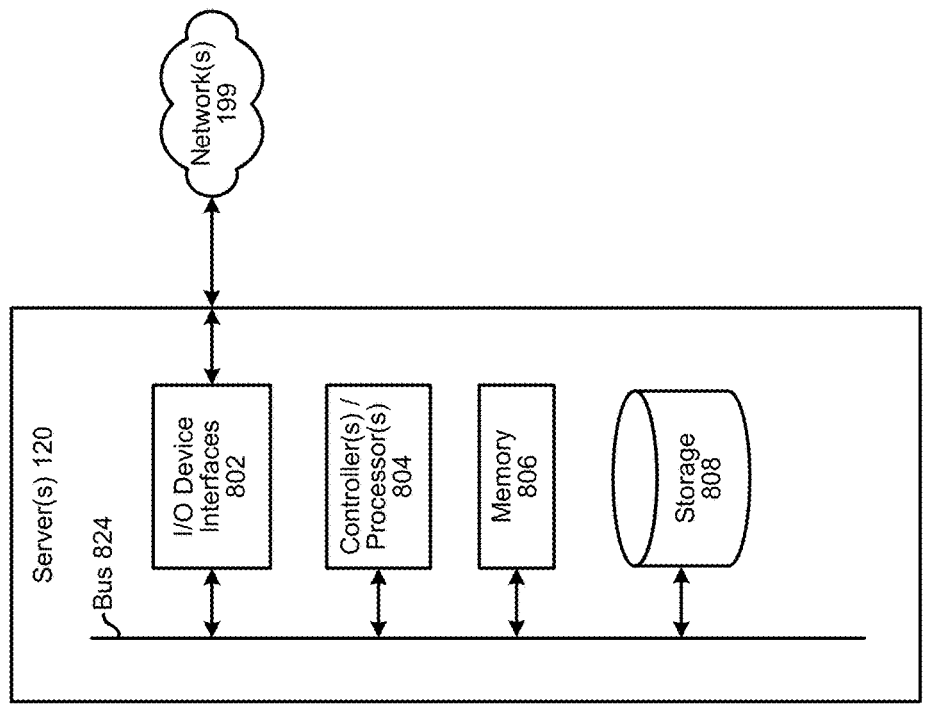
FIG. 8 is a block diagram conceptually illustrating example components of a server according to embodiments of the present disclosure.

FIG. 7 is a block diagram conceptually illustrating a user device 110 that may be used with the system. FIG. 8 is a block diagram conceptually illustrating example components of a remote device, such as the server(s) 120, that may assist with speech recognition processing, natural language processing, or command processing. Multiple servers 120 may be included in the system, such as one server 120 for performing speech recognition processing, one server 120 for performing natural language processing, etc. In operation, each of these devices (or groups of devices) may include computer-readable and computer-executable instructions that reside on the respective device (110/120), as will be discussed further below.

Each of these devices (110/120) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120) may also include a data storage component (708/808) for storing data and controller/processor-executable instructions. Each data storage component (708/808) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (702/802).

Computer instructions for operating each device (110/120) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120) includes input/output device interfaces (702/802). A variety of components may be connected through the input/output device interfaces (702/802), as will be discussed further below. Additionally, each device (110/120) may include an address/data bus (724/824) for conveying data among components of the respective device. Each component within a device (110/120) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may further include a display 710 configured to display content.

Via antenna(s) 714, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (702/802) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (702/802), processor(s) (704/804), memory (706/806), and/or storage (708/808) of the device(s) 110 and server(s) 120, respectively. Thus, the speech recognition component 250 may have its own I/O interface(s), processor(s), memory, and/or storage; the natural language component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

As illustrated in FIG. 9, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the content source server(s) 125, or others. The support devices may connect to the network(s) 199 through a wired connection or wireless connection. Networked devices may capture audio using one-or-more built-in or connected microphones or other audio capture devices, with processing performed by speech recognition components, natural language components, or other components of the same device or another device connected via the network(s) 199, such as the speech recognition component 250, the natural language component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   during a first period of time:
   receiving, from a first remote device, first content data associated with a topic;
   receiving, from a second remote device, second content data associated with the topic;
   based on the first content data and the second content data both being associated with the topic, grouping the first content data and the second content data to generate first grouped data;
   determining the first remote device and the second remote device correspond to a number of remote devices satisfying a threshold number of remote devices;
   storing, based on the number satisfying the threshold number, the first grouped data as first stored data;
   during a second period of time after the first period of time:
   receiving, from a first device, input audio data corresponding to an utterance;
   performing speech processing on the input audio data to determine a command corresponding to the topic;
   determining, in a profile associated with the first device, a preferred content source associated with the topic;
   determining the first remote device corresponds to the preferred content source;
   performing text-to-speech (TTS) processing on the first content data to generate output audio data; and
   causing the first device to emit audio corresponding to the output audio data.

2. The computer-implemented method of claim 1, further comprising:
   determining a number of sources that, within a time period, publish data corresponding to the topic;
   determining that the number falls below a frequency threshold; and
   determining the first stored data is no longer trending.

3. The computer-implemented method of claim 1, further comprising:
   determining, during a first time period, a first number of sources from which a first plurality of data corresponding to the topic is received; determining, during a second time period, a second number of sources from which a second plurality of data corresponding to the topic is received;
   determining the second number is less than the first number; and
   determining, based on the second number being less than the first number, a future time when the first stored data is to be deleted from a trending knowledge base.

4. The computer-implemented method of claim 3, further comprising:
   storing the first grouped data in a general knowledge base; and
   permitting the first grouped data to persist in the general knowledge base after the future time.

5. A system comprising:
   at least one processor; and
   at least one memory including instructions that, when executed by the at least one processor, cause the system to:
   receive input data;
   perform speech processing on the input data to determine the input data corresponds to a topic;
   determine, from profile data associated with a device, a preferred content source associated with the topic;
   determine stored data corresponding to the topic, the stored data being received from a number of content sources satisfying a threshold number of content sources;
   determine at least a portion of the stored data received from the preferred content source; and cause the device to output content corresponding to the at least a portion.

6. The system of claim 5, wherein the at least one memory further includes instructions that, when executed by the at least one processor, further cause the system to:
receive first text data from a first content source;
receive second text data from a second content source;
perform natural language processing on the first text data to determine the topic;
perform natural language processing on the second text data to determine the topic;
determine the number to include at least to the first content source and the second content source;
determine the number satisfies the threshold number; and
generate, based on the number satisfying the threshold number, the stored data to include the first text data and the second text data.

7. The system of claim 5, wherein the at least one memory further includes instructions that, when executed by the at least one processor, further cause the system to:
determine a number of content sources that, within a time period, publish data corresponding to the topic;
determine that the number falls below a frequency threshold; and
based on the number falling below the frequency threshold, determine a future time that the stored data is to be deleted from a trending knowledge.

8. The system of claim 7, wherein the at least one memory further includes instructions that, when executed by the at least one processor, further cause the system to:
store the stored data in a general knowledge base as second stored data; and
permit the second stored data to persist in the general knowledge base after the future time.

9. The system of claim 5, wherein the at least one memory further includes instructions that, when executed by the at least one processor, further cause the system to:
determine, during a first time period, a first number of content sources from which a first plurality of data corresponding to the topic is received;
determine, during a second time period, a second number of content sources from which a second plurality of data corresponding to the topic is received;
determine the second number is less than the first number; and
determine, based on the second number being less than the first number, a future time when the stored data is to be deleted.

10. The system of claim 5, wherein the at least one memory further includes instructions that, when executed by the at least one processor, further cause the system to:
perform natural language processing on the stored data to generate natural language results;
generate, based on the natural language results, a synopsis of the stored data; and
cause the device to output content corresponding to the synopsis.

11. The system of claim 5, wherein the stored data corresponds to at least one of website content data, news data, news feed data, podcast data, or rich site summary (RSS) feed data.

12. The system of claim 5, wherein the stored data includes a plurality of data files received from a single content source, the plurality of data files satisfying a threshold number of data files.

13. A computer-implemented method comprising:
receiving input data;
performing speech processing on the input data to determine the input data corresponds to a topic;
determining, from profile data associated with a device, a preferred content source associated with the topic;
determining stored data corresponding to the topic, the stored data being received from a number of content sources satisfying a threshold number of content sources;
determining at least a portion of the stored data received from the preferred content source; and
causing the device to output content corresponding to the at least a portion.

14. The computer-implemented method of claim 13, further comprising
receiving first text data from a first content source;
receiving second text data from a second content source;
performing natural language processing on the first text data to determine the topic;
performing natural language processing on the second text data to determine the topic;
determining the number to include at least to the first content source and the second content source;
determining the number satisfies the threshold number; and
generating, based on the number satisfying the threshold number, the stored data to include the first text data and the second text data.

15. The computer-implemented method of claim 13, further comprising:
determining a number of content sources that, within a time period, publish data corresponding to the topic;
determining that the number falls below a frequency threshold; and
based on the number falling below the frequency threshold, determine a future time that the stored data is to be deleted from a trending knowledge base.

16. The computer-implemented method of claim 15, further comprising:
storing the stored data in a general knowledge base as second stored data; and
permitting the second stored data to persist in the general knowledge base after the future time.

17. The computer-implemented method of claim 13, further comprising:
determining, during a first time period, a first number of content sources from which a first plurality of data corresponding to the topic is received;
determining, determine a second time period, a second number of content sources from which a second plurality of data corresponding to the topic is received;
determining the second number is less than the first number; and
determining, based on the second number being less than the first number, a future time when the stored data is to be deleted.

18. The computer-implemented method of claim 13, further comprising:
performing natural language processing on the stored data to generate natural language results;
generating, based on the natural language results, a synopsis of the stored data; and
causing the device to output content corresponding to the synopsis.

19. The computer-implemented method of claim 13, wherein the stored data corresponds to at least one of web site content data, news data, news feed data, podcast data, or rich site summary (RSS) feed data.

20. The computer-implemented method of claim 13, wherein the stored data includes a plurality of data files received from a single content source, the plurality of data files satisfying a threshold number of data files.

* * * * *